United States Patent
Vasseur et al.

(10) Patent No.: US 9,398,035 B2
(45) Date of Patent: Jul. 19, 2016

(54) ATTACK MITIGATION USING LEARNING MACHINES

(71) Applicant: Cisco Technology, Inc., San Jose, CA (US)

(72) Inventors: Jean-Philippe Vasseur, Saint Martin d'Uriage (FR); Javier Cruz Mota, Assens (CH); Andrea Di Pietro, Lausanne (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 14/165,424

(22) Filed: Jan. 27, 2014

(65) Prior Publication Data

US 2015/0188935 A1    Jul. 2, 2015

Related U.S. Application Data

(60) Provisional application No. 61/922,568, filed on Dec. 31, 2013.

(51) Int. Cl.
*H04L 29/06*  (2006.01)
*H04W 12/12*  (2009.01)
*G06N 99/00*  (2010.01)

(52) U.S. Cl.
CPC .......... *H04L 63/1416* (2013.01); *G06N 99/005* (2013.01); *H04L 63/1441* (2013.01); *H04L 63/1458* (2013.01); *H04W 12/12* (2013.01)

(58) Field of Classification Search
None
See application file for complete search history.

(56) References Cited

U.S. PATENT DOCUMENTS

| | | |
|---|---|---|
| 7,137,145 B2 | 11/2006 | Gleichauf |
| 7,483,972 B2 | 1/2009 | Bhattacharya et al. |
| 7,526,806 B2 | 4/2009 | Wiley et al. |
| 7,607,041 B2 | 10/2009 | Kraemer et al. |
| 7,653,941 B2 | 1/2010 | Gleichauf |
| 7,779,471 B2 | 8/2010 | Balasubramaniyan et al. |
| 8,028,160 B1 * | 9/2011 | Orr ............................... 713/151 |

(Continued)

FOREIGN PATENT DOCUMENTS

WO    WO 2005/011195 A2    2/2005
WO    WO 2012/168898 A1    12/2012

OTHER PUBLICATIONS

Vasseur, et al., "Computer Network Attack Mitigation", U.S. Appl. No. 61/922,568, filed Dec. 31, 2013, 58 pages, U.S. Patent and Trademark Office, Alexandria, VA.

(Continued)

*Primary Examiner* — David Le
(74) *Attorney, Agent, or Firm* — Parker Ibrahim & Berg LLC; James M. Behmke; Stephen D. LeBarron (57) ABSTRACT

In one embodiment, techniques are shown and described relating to attack mitigation using learning machines. A node may receive network traffic data for a computer network, and then predict a probability that one or more nodes are under attack based on the network traffic data. The node may then decide to mitigate a predicted attack by instructing nodes to forward network traffic on an alternative route without altering an existing routing topology of the computer network to reroute network communication around the one or more nodes under attack, and in response, the node may communicate an attack notification message to the one or more nodes under attack.

20 Claims, 5 Drawing Sheets

(56) References Cited

U.S. PATENT DOCUMENTS

| | | | |
|---|---|---|---|
| 8,230,498 | B2 | 7/2012 | Shaffer et al. |
| 8,261,355 | B2 | 9/2012 | Rayes et al. |
| 8,488,488 | B1 | 7/2013 | Hermanns et al. |
| 2004/0249678 | A1* | 12/2004 | Henderson ............ 705/4 |
| 2008/0270601 | A1* | 10/2008 | Ishikawa ............ 709/224 |
| 2012/0144038 | A1 | 6/2012 | Hildebrand |
| 2012/0155276 | A1 | 6/2012 | Vasseur et al. |
| 2012/0210422 | A1 | 8/2012 | Friedrichs et al. |
| 2012/0307624 | A1 | 12/2012 | Vasseur et al. |
| 2013/0139261 | A1 | 5/2013 | Friedrichs et al. |
| 2013/0269032 | A1 | 10/2013 | Chasko et al. |
| 2013/0305357 | A1 | 11/2013 | Ayyagari et al. |
| 2013/0305362 | A1 | 11/2013 | Hermanns et al. |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Wood, et al., "JAM: A Jammed-Area Mapping Service for Sensor Networks", 24th IEEE Real-Time Systems Symposium (RTSS 2003), Dec. 2003, pp. 286-297, Institute of Electrical and Electronics Engineers.

Wood, et al., "DEEJAM: Defeating Energy-Efficient Jamming in IEEE 802.15.4-Based Wireless Networks", 4th Annual IEEE Communications Society Conference on Sensor, Mesh and Ad Hoc Communications and Networks (SECON '07), Jun. 2007, pp. 60-69, Institute of Electrical and Electronics Engineers.

Xu, et al., "Jamming Sensor Networks: Attack and Defense Strategies", IEEE Network, vol. 20, Issue 3, May-Jun. 2006, pp. 41-47, Institute of Electrical and Electronics Engineers.

European Search Report dated Mar. 27, 2015 issued in connection with European Application No. EP 14 19 7790.

European Search Opinion dated Mar. 27, 2015 issued in connection with European Application No. EP 14 19 7790.

Wei Yang, et al., "Stability Analysis of P2P Worm Propagation Model with Dynamic Quarantine Defense," Journal of Networks, vol. 6, No. 1, Jan. 2011, pp. 153-162.

Anhtuan Le et al., "6LoWPAN: a study on QoS security threats and countermeasures using intrusion detection system approach," International Journal of Communication Systems, vol. 25, No. 9, Sep. 23, 2012, pp. 1189-1212.

* cited by examiner

ATTACK MITIGATION USING LEARNING MACHINES

RELATED APPLICATIONS

This application claims priority to U.S. Provisional Application No. 61/922,568, filed Dec. 31, 2013, entitled: COMPUTER NETWORK ATTACK MITIGATION, by Vasseur et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to attack mitigation using learning machines. A node may receive network traffic data for a computer network, and then predict a probability that one or more nodes are under attack based on the network traffic data. The node may then decide to mitigate a predicted attack by instructing nodes to forward network traffic on an alternative route without altering an existing routing topology of the computer network to reroute network communication around the one or more nodes under attack, and in response, the node may communicate an attack notification message to the one or more nodes under attack.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
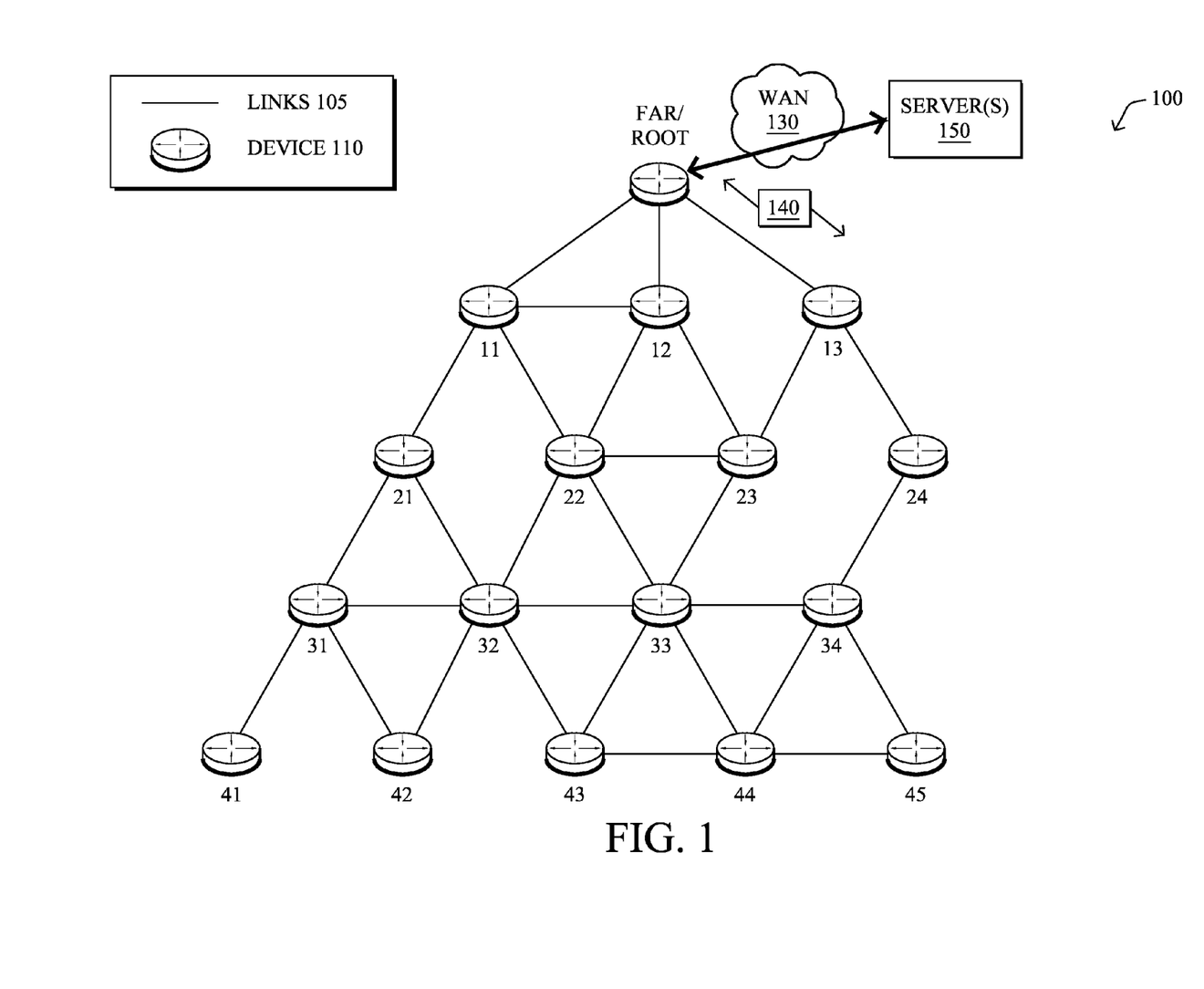
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
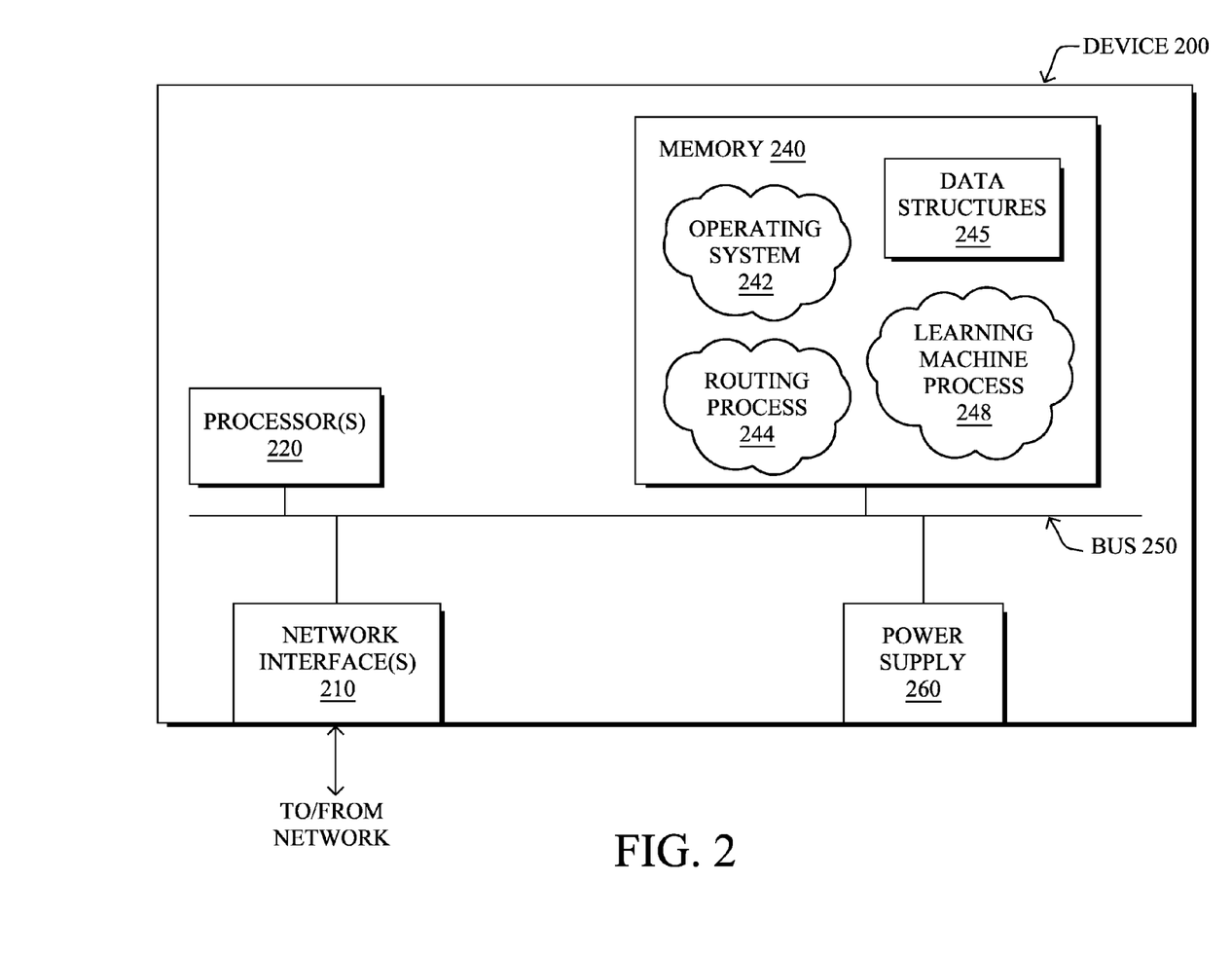
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
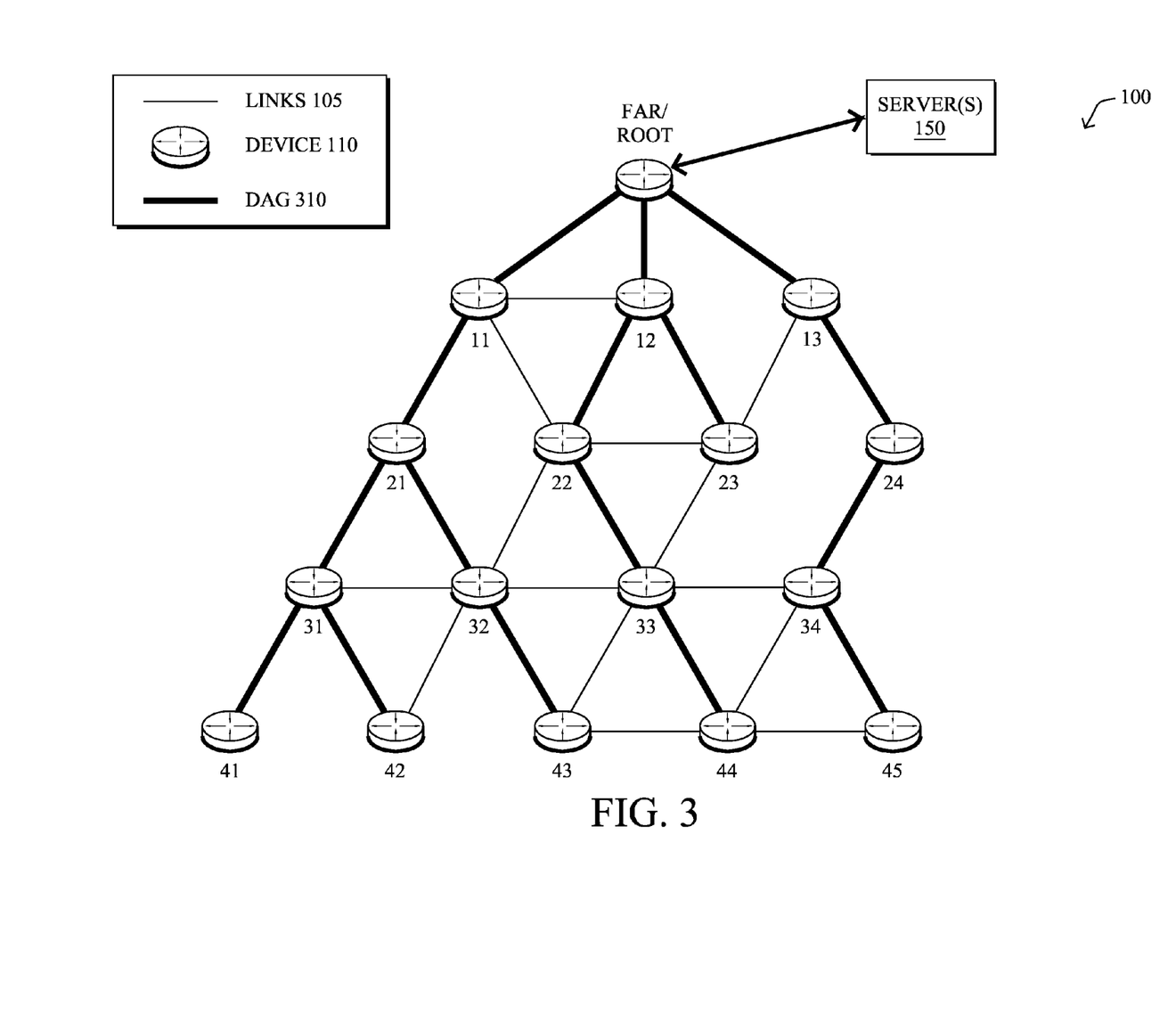
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data.

The interesting aspect of ANNs, though, is not that they can produce highly non-linear outputs of the input, the interesting aspect is that they can learn to reproduce a predefined behavior through a training process. This capacity of learning has allow the successful application of ANNs to a wide variety of learning problems, such as medical diagnosis, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming, by any means, at making a particular service unavailable (be it a certain application running on a server or network connectivity itself). This is usually performed by bringing the target's resources to exhaustion (again, target resources may range from bandwidth to memory and CPU).

In greater detail, a denial-of-service attack may consist in flooding a target network with hundreds of megabits of traffic (volume based DoS), exhausting a server state by opening a number of TCP connections (SYN flooding) or by making an HTTP server unavailable by sending it an overwhelming number of requests. An attack may be subtler and exploit well-known vulnerabilities in the target system (e.g. a large number of fragmented IP packets may exhaust the resources of a router).

Nowadays, denials of service attacks are mostly distributed: they are indeed carried out by multiple sources at the same time, thus making it more difficult to track. In many cases botnets (i.e. armies or infected hosts spread across the network and under the control of a single master) are used for mounting DoS attacks. In addition, source addresses used for attacks can be spoofed, so that blocking an offending address is potentially useless.

A large literature exists about detection and mitigation of DoS attacks. Such attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things represents a completely different scenario and requires novel detection and reaction strategies. Its highly distributed nature implies that there is no central vantage point where an attack can be observed. In addition, its very scarce resources force reporting from the nodes to a central location to be reduced to a minimum.

On top of the lack of global information, detecting DoS in the IoT in made harder by the fact that a much subtler interference may be enough for bringing the network down.

For example, a jamming node can prevent a node from decoding traffic by just emitting short bursts when activity on the channel is detected. This can isolate a large portion of the network which uses that node as a parent and cut off a large portion of the network.

In addition, in case of battery operated nodes, a slow but steady flow of malicious traffic can exhaust a node's battery, thus making it useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data are typical of a known anomalous behavior —Possible Attacks Against IoT—

Even though the existing literature about attacks against the IoT is relatively reduced, a number of attacks against sensor network technologies apply with a few minor modifications.

Such attacks can be roughly classified into two classes: insider attacks (where the malicious node needs to be authenticated and be in possession of the network encryption keys) and outsider attacks (where the attacker just needs to be within the radio range of the victims).

In particular, a number of attacks against routing performed by a malicious node in the DAG can be imagined.

A node can, for example, perform selective forwarding: while still participating correctly to the routing protocol, it can just discard some of the traffic messages that it is asked to forward. Although this can be revealed by end-to-end mechanisms, due to the low traffic rate and lossiness of the IoT networks detection of the issue can be difficult and slow.

Other attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming) or attack only a particular type of traffic (selective jamming). The damage from a jamming attack can be maximized if the attacker is able to estimate the centrality of a node in the routing topology (this can be obtained by accounting the amount of traffic transmitted and received by each node, by leveraging the fact that the link layer addresses are in clear). Once the jammer has detected the most central node, it can try to make it unreachable for its descendants, which will in turn be forced to select another parent. This can potentially create continuous route oscillations and convergences.

Other kinds of external denial-of-services attacks can be performed by exploiting the fact that a number of messages in the WPAN do not need authentication: among those are discovery beacons and some of the EAPoL messages for authentication.

In particular, discovery beacons can be used for injecting bogus synchronization information in the network, so as to prevent two nodes from meeting on the right unicast communication frequency.

EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may be for authentication requests can be rate-limited. However this may result in legitimate nodes being prevented from authenticating when an attack is in progress.

Other attacks can be performed against the 802.11i protocol which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), firmware download to upgrade (e.g. to upgrade AMI meter software to a newer version), and power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

Notably, once a DoS attack is detected, it becomes required to activate some form of control loop to mitigate the issue. In its simple form, this may consist in sending an alarm to the user in the form of a network management message or via the NMS. In addition, in many circumstances it is required to activate some close loop control from the edge of the network in order to quickly mitigate/isolate, if not remediate, the issue. Moreover, the open nature of the physical medium and the fact that unicast frequency scheduling of the nodes is broadcasted in clear using the IEEE 802.15.4 link layer make it extremely difficult to make the attacker powerless. Even if routing can be reconfigured in order to isolate the attacked nodes, it is difficult to prevent an attacker from changing its target. In fact, the attacker can leverage the network reaction in order to make routing unstable. The only safe countermeasure may be completely isolating the physical range of the attacker, but this may have a huge impact on the network functionality (in fact, this may even make a portion of the network unreachable).

Attack Mitigation Using Learning Machines

The techniques herein provide a closed loop control mechanism whereby a learning machine detecting that a node N is under DoS attack with a probability p may send a unicast IPv6 message (e.g., an attack notification message) to the node N (or a set of nodes in which case the IPv6 message is multicast) using the layer-2 broadcast slot. Upon receiving the message, the node may trigger a routing update notifying all nodes in its sub-DAG. All notified nodes may then examine alternate disjoint paths, and according to the policy for each class of services, the path cost increase and the probability p, decide of rerouting traffic along alternate paths. Nodes may continue to generate artificial traffic to improve the accuracy of DoS attack detection and once the alarm is cleared (e.g., the node is no longer under attack), the mechanism described above stops so as to restore the previous network states.

In most IoT networks such as LLN, when a node is under attack, for example using a jamming (selective/reactive) approach, the consequence of a DoS is that the node can no longer receive any packet. When the DoS is not-so-subtle and every single packet destined to a node N1 is jammed by the malicious node M, the node N1 stops receiving traffic from say the node N2, N3, etc. leading to making the node effectively down. As soon as any node that belongs to the sub-DAG rooted at node N1 generates traffic traversing the node N1, the link layer or other type of keep-alive mechanisms (at layer 2, 3 or above) detects a lack of connectivity with N1 and the routing protocol will modify the routing topology, leading to rerouting the traffic. Unfortunately, attacks are generally subtler, and jamming may purposely be selective and/or designed to only impact a certain percentage of the traffic destined to node N1 (also, the jammer may selectively target a subset of messages so as to prevent quick reaction by the routing protocol). In such a situation, dynamic link metrics such as the ETX would slowly deteriorate and the link may not be detected as down. Eventually, nodes attached to the targeted nodes would move to other DAGs (if the ETX increases sufficiently). Such a reroute would be extremely slow since the ETX metric is smoothed out in LLN in order to avoid oscillations in the network. An even worse situation would take place if the attack is non systematic (impact a percentage of the traffic) and/or the DoS is targeted at multiple nodes, switching between nodes.

Yet another subtle attack might be to systematically attack such nodes but for a short enough period of time so that traffic gets impacted but the routing metric does not change fast enough to trigger a reroute. The techniques herein specify a mechanism for closed loop control fed by the Learning Machine (LM) in use such as an ANN using routing in order to mitigate these attacks. It is contemplated that the LM may be hosted on any capable node (e.g., a NMS, FAR, etc.).

Figure 4:
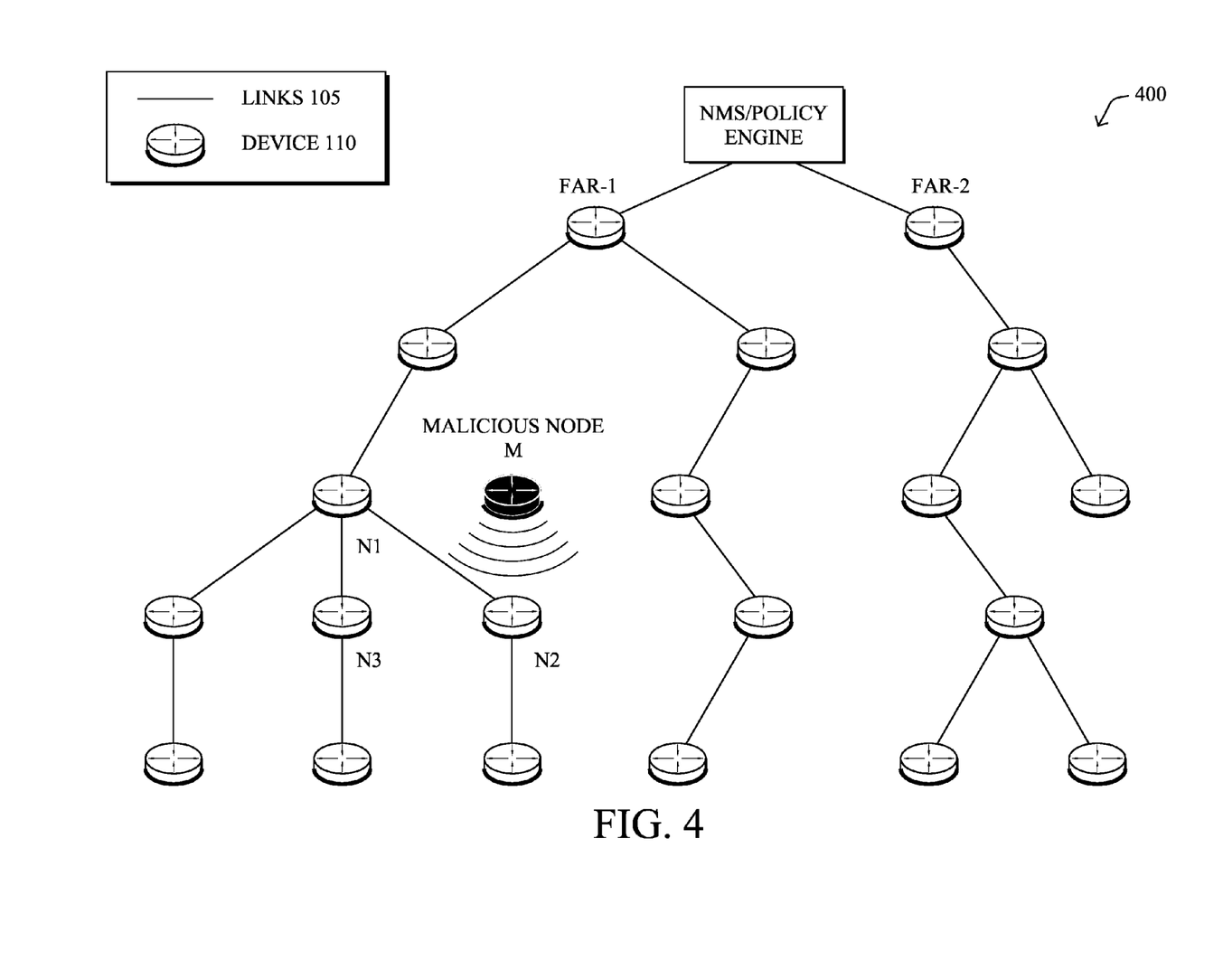
FIG. 4 illustrates an example of attack mitigation using learning machines.

Operationally, as shown in (and with general reference to) FIG. 4, the first component of the techniques herein lies in using a secured broadcast packet to all nodes suspected to be under attack. Once the LM hosted on the DAG root (or alternatively on a controller) detects that a node N1 is under attack with a probability p, it sends a newly defined IP unicast message to the node N1, for example, an attack notification message. Such an IPv6 unicast packet comprises various information such as the probability that the node is indeed under attack, and is sent using the broadcast layer-2 frame (indeed, if the node N1 is being attacked, it may not be able to receive any traffic but the broadcast traffic as explained previously). In one embodiment, if there is one node suspected to be under attack, the message may be destined to the node using a unicast IPv6 address (and a broadcast layer-2 address).

In another embodiment when a set of nodes are being attacked, the LM may send a newly defined multicast IPv6 message (e.g., an attack notification message) using a multicast well-known layer-3 address (learned by nodes when registering) encapsulated in a broadcast layer-2 frame (in which case the message would carry the list of nodes suspected to be under attack along with their respective probability of attacks; the list of nodes may be identified by their IPv6 address, compressed or non-compressed, or a bloom filter for higher compression). As an alternative, other techniques can be used in order to safely communicate with the nodes under attack (such as using a unicast tunnel towards a proxy node, which would in turn cover the last hops to the node under attack by using a broadcast frame).

Note that the DoS detection may be local, should the LM be hosted on the node under attack. In the case of hierarchical classifiers, the weak classifier may wait for strong classifier feedback in order to trigger the mitigation process specified below. The hierarchical classifier approach can be combined with a lightweight anomaly detection mechanism on the node. Indeed, the use of a lightweight anomaly detection embedded in the node can be used as an activator of the use of the hierarchical (weak/strong) classifier.

Upon receiving such a message, the node may trigger the following set of actions.

In contrast with existing approaches used by a protocol such as RPL whereby a node losing connectivity with all of its parents may set its rank to infinite in order to trigger routing poisoning, the node (e.g. N1) would originate a routing advertisement (e.g., an attack mitigation reroute request) in order to report the notification of attack by setting a newly defined Flag called to A (Attack) flag along with the probability of being attacked p (provided by the LM mechanism used for detection). In the case of RPL, the protocol used in LLN, a DIO message is sent by using the broadcast slot, comprising the newly defined flag A set to 1 and a newly defined TLV reporting the probability p, all metrics being unchanged (link metric may be updated, but connectivity under such attacks is not lost). Note that nodes receiving a DIO message with the A flag set should themselves advertise a routing message update with the A flag set.

Upon receiving the updated DIO message, each node in the sub-DAG would then trigger the following algorithm.

Knowing that one of their ancestors is under attack with a probability p based on receiving the attack mitigation reroute request, the node would then look for alternative paths. A local configurable timer T1 is armed. In one embodiment, each node would then keep the last path cost advertised by candidate best next hops. In another embodiment, the node may search for locally reachable neighbors (e.g. for example sending a DIS message) in order to search for alternative paths. T1 is used to ensure that other candidate paths do not comprise the node under attack. The current path cost called Cost(current-path) is then compared to the best alternate paths, free of nodes under attacks called Cost(alternate-path).

If Cost(alternate-path)<K*Cost(current-path) with K>1 and p>P_min, then the node may start switching traffic of class of service S1, . . . , Sn to the alternate computed paths, subject to local policy. For example, a local policy may consist in switching delay sensitive traffic if the path cost stretch is no more than 30% and the probability of attack along the current path is more than 25%. Many other combinations of policies are possible taking into account the path cost increase and the probability of attack. Such rules may be configured using a lightweight network management protocol such as CoAP, or upon registration using a novel DHCP extension. Rules may be of complex form and per-CoS based. It may be desirable to have different policies to switch traffic based on the CoS.

In contrast with existing rerouting techniques, the routing topology is left unchanged. The traffic is rerouted onto another path avoiding the node suspected to be under attack, effectively not following the shortest path (the routing topology is thus unchanged, which is of the utmost importance to prevent such attacks from triggering routing oscillations). Furthermore, a change in the routing topology may be observed by the attacker that may consequently adapt dynamically its attacks, which is highly undesirable.

The last component of this technique lies in the ability to detect when the node suspected to be under attack should clear the A bit. To that end, the techniques herein specify a process whereby nodes under attack may switch some traffic according to policy as described above but would still continue to artificially send traffic of the same CoS towards the path comprising the node suspected to be under attack. This will allow the LM to continue gathering data and determine when the node is no longer under attack, or potentially to determine whether the event was a false alarm. In both cases, a mechanism can be used in parallel for collecting additional training data for the LM in the DAG root and improve its performance. Furthermore, this artificial traffic would avoid revealing to a potential attacker that the attack has been detected, in which case it may move to another attack targeting another node. Note that the decision to send the notification message described in the first component may be driven by the level of confidence of the LM (probability p) but also the position of the node in the network, its criticality (level of centrality). Once the LM determines that the state (under attack) should be cleared, the same notification message is sent to the node with a probability p=0.

In yet another embodiment, the LM may add a TLV indicating whether the mechanism described above should be activated until further notification otherwise by the learning machine, or for a specific period of time T.

A newly defined network management message may also be specified that is used to report that the mechanism specified in this invention has been triggered.

The techniques described herein, therefore, provide for attack mitigation using learning machines. In particular, the techniques herein provide a mitigation process according to which traffic potentially impacted by a node under attack is silently rerouted onto alternative paths, according to various parameters. With existing technologies, such a DoS would not be mitigated: traffic would be rerouted as a result of topology changes, which would be very slow or may not even take place in the event that the attack is sufficiently short, or has a sufficiently minimal impact, so as not to trigger any topology alteration.

Figure 5:
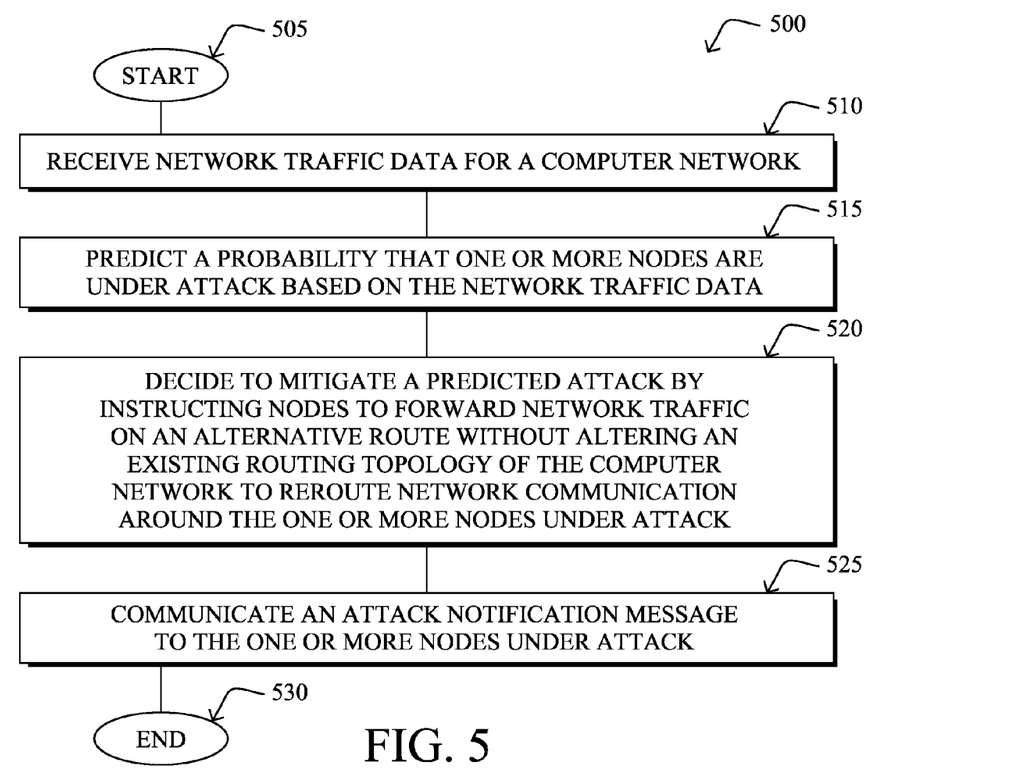
FIG. 5 illustrates an example simplified procedure for attack mitigation using learning machines, particularly from the perspective of a management device.

FIG. 5 illustrates an example simplified procedure 500 for attack mitigation using learning machines, particularly from the perspective of a management device. The procedure 500 may start at step 505, and continue to step 510 where, as described above, a management device may receive network traffic data for a computer network. As shown in step 515, the management device may then predict a probability that one or more nodes are under attack based on the network traffic data. The management device may then decide to mitigate the predicted attack by instructing nodes to forward network traffic on an alternative route without altering an existing routing topology of the computer network to reroute network communication around the one or more nodes under attack, as shown in step 520. Advantageously, this prevents undesirable routing oscillations from taking place in the network. In step 525, the management device may communicate an attack notification message to the one or more nodes under attack, which may then implement attack mitigation procedures (e.g., implementing re-routing protocols). As discussed above, the procedure may continuously monitor network traffic from the one or more nodes under attack to assess when the attack is over, and then communicate a notification to the affected nodes to stop implementing attack mitigation procedures. Illustratively, the simplified procedure may end at step 625.

Figure 6:
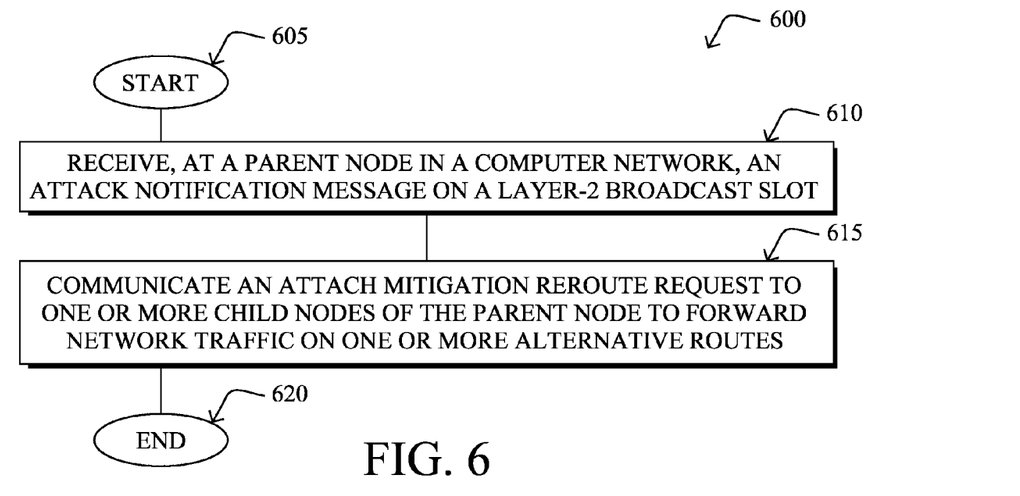
FIG. 6 illustrates an example simplified procedure for attack mitigation using learning machines, particularly from the perspective of a parent node predicted to be under attack.

Similarly, FIG. 6 illustrates an example simplified procedure 600 for attack mitigation using learning machines, particularly from the perspective of a node predicted to be under attack. The procedure 600 may start at step 605, and continue to step 610 where, as described above, a parent node in a computer network may receive an attack-mitigation reroute request on a layer-2 broadcast slot. As shown in step 615, the parent node may then communicate an attack mitigation reroute request to one or more child nodes of the parent node to forward network traffic on one or more alternative routes. Illustratively, the simplified procedure may end at step 720.

It should be noted that while certain steps within procedures 500 and 600 may be optional as described above, the steps shown in FIGS. 5 and 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network attack mitigation using learning machines, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving network traffic data for a computer network;
   predicting a probability that one or more nodes are under attack based on the network traffic data;
   deciding to mitigate a predicted attack by instructing nodes to reroute network traffic around the one or more nodes under attack on an alternative route without altering an existing routing topology of the computer network, wherein the nodes determine the alternate route from examined alternate disjoint paths based on a policy for class of service of the rerouted traffic, an increase in cost of the alternative route and a probability; and, in response,
   communicating an attack notification message to the one or more nodes under attack.

2. The method as in claim 1, wherein predicting further comprises:
   using a machine learning model on the network traffic data to predict the probability that the one or more nodes are under attack.

3. The method as in claim 1, wherein the attack notification message is communicated using a layer-2 broadcast slot.

4. The method as in claim 1, wherein the attack notification message is communicated using a known multicast layer-3 address encapsulated in a broadcast layer-2 frame.

5. The method as in claim 4, wherein the encapsulated attack notification message includes a list of one or more nodes predicted to be under attack associated with probabilities of attack for each of the one or more nodes predicted to be under attack.

6. The method as in claim 1, wherein the one or more nodes predicted to be under attack, in response to receiving the attack notification message, communicate an attack mitigation reroute request to one or more child nodes.

7. The method as in claim 6, wherein the attack mitigation reroute request provides instructions to the one or more child nodes to search for alternate routing paths without altering existing network topology.

8. The method as in claim 1, further comprising:
   receiving real-time network traffic data from the one or more nodes under attack;
   determining, based on the real-time network traffic data from the one or more nodes under attack, that the attack is over; and
   communicating a notification message to the one or more nodes to stop communicating attack mitigation reroute requests.

9. A method, comprising:
   receiving, at a parent node in a computer network, an attack-mitigation reroute request on a layer-2 broadcast slot; and, in response,
   communicating an attack mitigation reroute request to one or more child nodes of the parent node to reroute network traffic around the one or more child node under attack on one or more alternative routes, wherein the parent node determines the alternative route from examined alternate disjoint paths based on a policy for class of service of the rerouted traffic, an increase in cost of the alternative route and a probability that one or more child nodes are under attack.

10. The method as in claim 9, wherein the one or more alternate routes do not alter existing network topology.

11. The method as in claim 9, wherein the attack mitigation reroute request notifies the one or more child nodes of the probability that the parent node is under attack.

12. The method as in claim 11, wherein the attack mitigation reroute request instructs, based on the probability that the parent node is under attack, the one or more child nodes to communicate a routing advertisement update.

13. An apparatus, comprising:
   one or more network interfaces to communicate within a computer network;
   a processor coupled to the network interfaces and configured to execute one or more processes; and
   a memory configured to store a process executable by the processor, the process when executed operable to:
   receive network traffic data for a computer network;
   predict a probability that one or more nodes are under attack based on the network traffic data;
   decide to mitigate a predicted attack by instructing nodes to reroute network traffic around the one or more nodes under attack on an alternative route without altering an existing routing topology of the computer network, wherein the nodes determine the alternate route from examined alternate disjoint paths based on a policy for class of service of the rerouted traffic, an increase in cost of the alternate route and the probability; and, in response,
   communicate an attack notification message to the one or more nodes under attack.

14. The apparatus as in claim 13, wherein the process when executed is further operable to:
   use a machine learning model on the network traffic data to predict the probability that the one or more nodes are under attack.

15. The apparatus as in claim 14, wherein the machine learning model is hosted on a node selected from the group consisting of a capable node, a network management server (NMS), and a field area router (FAR).

16. The apparatus as in claim 13, wherein the attack notification message is communicated using a layer-2 broadcast slot.

17. The apparatus as in claim 13, wherein the attack notification message is communicated using a known multicast layer-3 address encapsulated in a broadcast layer-2 frame.

18. The apparatus as in claim 13, wherein the encapsulated attack notification message includes a list of one or more nodes predicted to be under attack associated with probabilities of attack for each of the one or more nodes predicted to be under attack.

19. The apparatus as in claim 13, wherein the one or more nodes predicted to be under attack, in response to receiving the attack notification message, communicate an attack mitigation reroute request to one or more child nodes.

20. The apparatus as in claim 13, wherein the attack mitigation reroute request provides instructions to the one or more child nodes to search for alternate routing paths without altering existing network topology.

* * * * *